United States Patent [19]

Chalier

[11] Patent Number: 4,473,330
[45] Date of Patent: Sep. 25, 1984

[54] AUTOMATIC TAPPING DEVICE FOR USE ON A MECHANICAL PRESS

[75] Inventor: Jean Chalier, Saint-Etienne, France

[73] Assignee: Centre Technique Des Industries Mecaniques and S.E.B. S.A., Selongey, France

[21] Appl. No.: 330,249

[22] Filed: Dec. 14, 1981

[30] Foreign Application Priority Data

Dec. 12, 1980 [FR] France .................. 80 26357

[51] Int. Cl.$^3$ .................. B23B 47/00; B23B 49/00; B23G 1/00
[52] U.S. Cl. .................. 408/98; 10/129 A
[58] Field of Search .................. 408/42, 98, 110, 111, 408/124, 125, 128, 129, 137, 138; 29/57; 10/129 A, 136 R, 139 CN, 129 R

[56] References Cited

U.S. PATENT DOCUMENTS

| | | | |
|---|---|---|---|
| 2,314,138 | 3/1943 | Garbe | 10/136 R |
| 2,346,297 | 4/1944 | Garbe | 10/129 R |
| 3,162,873 | 12/1964 | Ohme | 408/98 |
| 3,579,687 | 9/1983 | Hoshi et al. | 10/129 A |

FOREIGN PATENT DOCUMENTS 513371  8/1952  Belgium .................. 10/129 A Primary Examiner—E. R. Kazenske
Assistant Examiner—Paul M. Heyrana, Sr.
Attorney, Agent, or Firm—Holman & Stern

[57] ABSTRACT

An automatic tapping device for use on a mechanical press including a screw member fixed rigidly to and extending from the upper surface of a lower block and a reversible actuating nut engaged on the screw and a rotary tapping-bit holder spindle rotatably mounted in an upper block. The actuating nut and the rotary tapping-bit holder are interconnected by a chain transmission, including gear wheels borne by an intermediate shaft. The invention is applicable to the tapping of parts on mechanical presses, such as eccentric stamping presses or deep-drawing presses.

6 Claims, 2 Drawing Figures

AUTOMATIC TAPPING DEVICE FOR USE ON A MECHANICAL PRESS

BACKGROUND OF THE INVENTION

1. The invention relates to an automatic tapping device for use on mechanical presses such as eccentric presses or crankshaft-operated deep-drawing presses.

2. Description of the Prior Art

Cheap metal parts are currently manufactured on mechanical stamping presses, for example eccentric presses, by means of multiple tools which, at a first station, punch holes in a sheet metal strip and, at a subsequent station, cut out parts, so that the parts fall separately almost finished from the machine. Often a large number of operations are carried out, for example, bending, raising of fastening lugs, and stamping operations at the edges of the holes (so called "staved") with a view to the tapping of said holes subsequently.

It is precisely to this operation of tapping the holes to which the present invention relates. Often, for this purpose, the parts are retaken to cause them to pass over a tapping machine, which considerably lowers the efficiency, and since it is necessary, in fact, to take more time to pick up the parts and tap them than to stamp them out. Working with presses is particularly economical, since one or several parts are delivered on each stroke of the press, which is why efforts have already been made to gain a part of this advantage by carrying out the tapping of the parts on the press itself, immediately after their punching, before they are cut out, which avoids picking up the parts again to tap them.

To carry out this type of operation, it has been proposed to use a device which includes a rotary taping-bit holder, which is mounted on the tool-holder of the press, the driving of the tapping-bit holder spindle in rotation being ensured from a rack and pinion system actuated by the vertical movement of the tool-holder. Such a device has, for example, been described in German Pat. No. 357 354 issued Nov. 30, 1982 in the name of ALBRECHT.

However, devices of this type generally necessitate modification of certain elements of the press, which constitutes a drawback.

It has also been proposed to use the approach movement of the two plates of the press to rotate one of the two elements, the screw or the nut, of a reversible screw and nut system and to drive in rotation, from this element, a rotary tapping-bit holder spindle.

Such devices have been described, for example, in U.S. Pat. No. 3,579,687 in the name of Hoshi, et al or in U.S. Pat. No. 3 162 873 in the name of OHME.

However these devices are of complicated structure and of great height, with numerous sliding movable parts, which necessitates a very heavy and hence expensive construction. In fact, the whole mechanism constituted particularly by the reversible screw/nut system, by the rotary tapping-bit holder spindle and by the gear transmission between this system and this spindle was mounted in a single tool-block mounted on the upper tool-holder of the press. This single tool-block hence had to include a sliding plate, with guiding columns of large cross-section, and required accurate, and hence expensive construction to avoid any risk of jamming.

In addition, the withdrawal of the tapping-bit, on the re-ascent of the press, could not be actuated positively by the re-ascent of the press plate. Powerful return springs had to be provided, wound around the aforesaid columns, to push back the sliding plate of the single tool-block and effect the driving in the reverse direction of the screw/nut system and of the tapping-bit holder. The necessity for these return springs again rendered the construction of the device heavier and more expensive.

It is as object of the present invention to provide a device for tapping on a press of the aforementioned type, but which is much simpler and less expensive than the devices known hitherto.

Other objects and advantages of the invention will be apparent from the description which follows.

BRIEF SUMMARY OF THE INVENTION

These objects are achieved by the invention due to the fact that one of the two elements, screw or nut, of the reversible screw/nut system is fixed rigidly in a second tool-block fixed to the other tool-holder of the press. The first block bearing the other elements (screw or nut), the tapping-bit holder spindle and the mechanical transmission between this element and the spindle is hence a simple and unitary structure without any sliding plate. The single spring provided in this first block acts only on the tapping-bit holder to avoid the risk of breakage of the tapping-bit.

According to the invention there is provided an automatic device for tapping on a mechanical stamping or deep-drawing press which comprises a block, to be mounted on one of the two upper and lower tool-holders of the press, said block comprising: a rotary tapping-bit holder spindle turning in said block; one of the elements, screw or nut, of a reversible screw/nut system, said element being mounted for rotation in said block; and a non-slip transmission connecting said element to the spindle; said device being characterised: in that it comprises a second block to be mounted on the other of the two tool-holders of the press, the other element is rigidly fixed in the second block, and a clamping chuck for the tapping-bit, mounted for rotation with the spindle and for axial sliding and is subject to the action of a spring.

By means of this particular device, the tapping of parts is carried out at the same time as the punching and other operations executed on other parts, on each press stroke, that is to say the tapping of the holes is carried out without an increase in time, since it delivers the same number of parts on each strike of the tools.

Hence the parts drop out fully finished at an economical cost price for the press work. Moreover, the device has the great advantage of being attachable on the tool-holders of the press, that is to say without requiring modification of the machine. In addition, it is simpler, less cumbersome and enables several tapping spindles to be driven.

The invention will be better understood on reading the description which follows with reference to the accompanying drawings which show, by way of example, a preferred embodiment of a device according to the invention.

DESCRIPTION OF A PREFERRED EMBODIMENT

Figure 1:
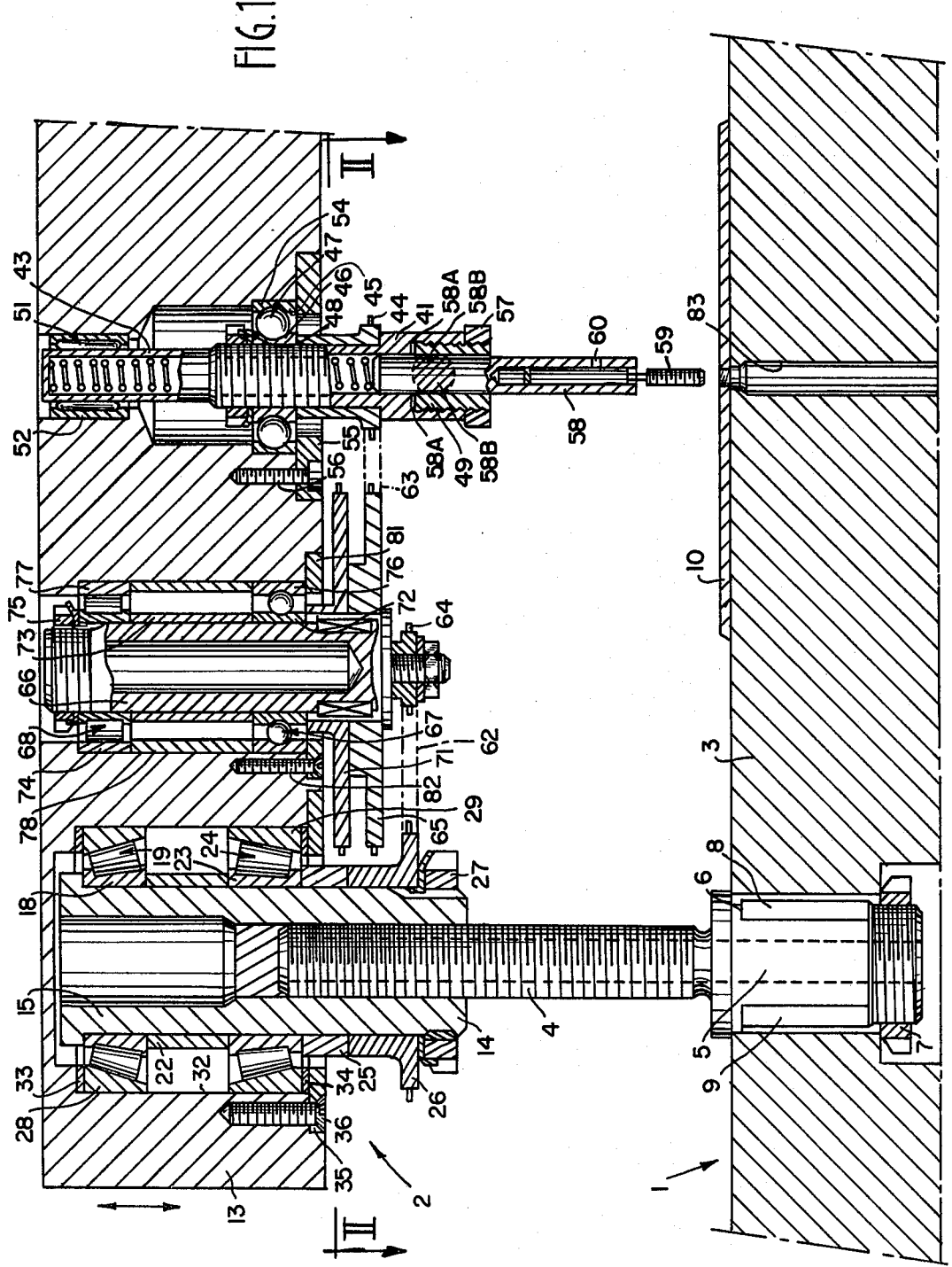
FIG. 1 is a vertical cross-sectional view of the whole of an embodiment of the device according to the invention, taken along the line I—I of FIG. 2.
Figure 2:
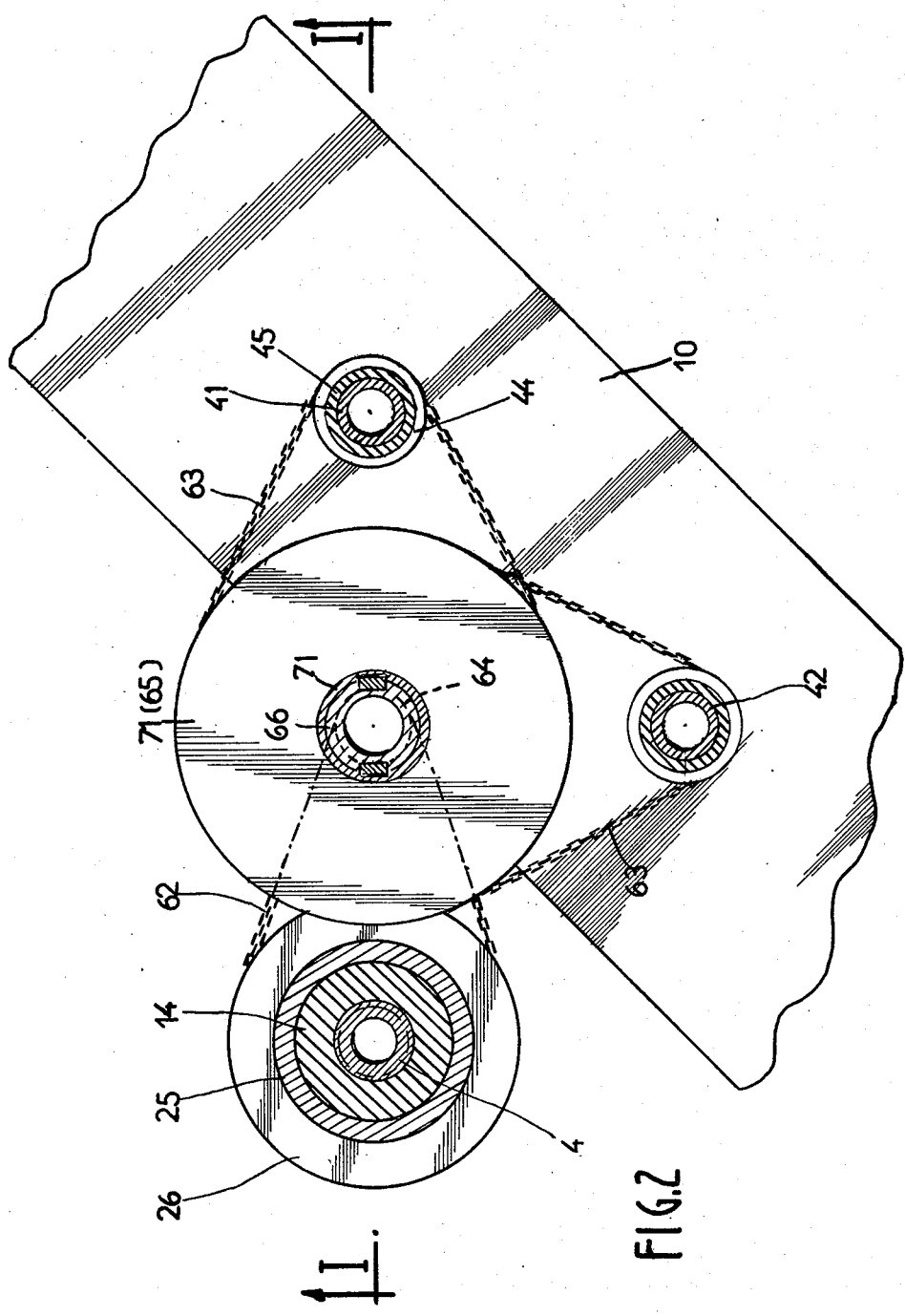
FIG. 2 is a horizontal cross-sectional view taken along the line II—II of FIG. 1.

The embodiment of the automatic device for tapping on a mechanical press shown in FIGS. 1 and 2 is constituted by a lower unit denoted as a whole by 1 and an upper unit denoted as a whole by 2.

The lower unit 1 includes a block 3 for mounting on a conventional lower tool-holder (not shown) of a stamping press. In the block 3, is fixed a vertical screw 4 whose lower end is, for this purpose, provided with a shouldered foot 5 engaged in a bore 6 of the block 3 in which it is fixed by a nut 7 screwed on the threaded end of the end of said foot. Two keys 8, 9, engaged in corresponding grooves of the bore 6 and of the foot 5 of the screw, positively prevent the latter from turning around its axis with respect to the block 3. The screw 4 is of the so-called "reversible" type, that is to say its pitch is very large, in other words, the angle of the helix of its threads is at least 45°; in the example, it is 70°. The axis of the screw 4 being vertical, it is hence parallel to the direction of periodic movement of approach and separation of the two units 1, 2 from one another.

The upper unit 2 includes a block 13 for mounting on a conventional upper tool-holder (not shown) of a press. In this block 13, are rotatably mounted various members. First a nut 14 conjugated with the screw 4 and engaged on the latter. On this shouldered bushing-shaped nut 15, are threaded successively: the inner ring 18 of a conical roller bearing 19, a spacer ring 22, the inner ring 23 of another conical roller bearing 24, another spacer ring 25 and the hub of a chain gear wheel 26, the whole set of these parts being locked on the bushing 15 by means of a nut 27. The outer rings 28, 29 of the two bearings 19 and 24 are housed in a bore 32 of the block 13, against washers of calibrated thicknesses 33, 34, the latter being retained by an annular closing plate 35 fixed in a recess of the lower surface of the block 13 by means of screw 36.

In the block 13, are also mounted for rotation two identical tapping-bit holder spindles 41, 42. Since these are identical, the details of construction of only one will be described. On the spindle 41, also in the form of a shouldered bushing, are threaded successively the hub of a chain gear wheel 44, the inner ring 46 of a ball bearing 47 with deep grooves, the whole being tightened by a nut 48. The upper part of the tapping-bit holder spindle 41 is centered in a needle bearing 51 housed in a corresponding recess 52 of the block 13. The outer ring 45 of the bearing 47 is retained in a bore 54 of the block 13 by an annular closing plate 55 fixed by means of screw 56.

A chuck 58, in which the tapping-bit 59 is fixed by means of a set screw 60, can slide in the cylindrical bore of the spindle 41; it is urged downwards by a helical spring 43 one end of which is supported against said chuck and the other end of which is supported in the upper closed end of the spindle 41. The axial travel of the chuck 58 is limited downwardly by the entering into contact of two shoulders 58A formed by two flats 58B of said chuck, with an adjustable stop constituted by the upper surface of a threaded ring 49 screwed into the lower part of the spindle 41 and fixed in the latter in any suitable position by means of a lock nut 57. The upper part of the threaded ring 49 has a surface whose cross-section has a shape complementary with that of the circular cross-section (shown in section in broken lines in FIG. 1) of the lower part of the chuck 58 with its two flats 58B, which ensures positive rotary drive of said chuck by the spindle 41. The gear wheel 26 mounted on the nut 14 and the gear 44 mounted on the tapping-bit holder spindle 41 are connected by a desmodromic transmission which includes two chains 62, 63 passing respectively over these two toothed elements, as well as over another toothed pinion 64 and over another gear wheel 65 fixed to an intermediate shaft 66 also rotatably mounted in the block 13 by means of a ball bearing 67 and a cylindrical roller bearing 68. The intermediate shaft 66 is produced in the shape of a blind shouldered bushing on which are threaded successively the gear wheel 65, another gear wheel 71 (for driving the other tapping-bit holder spindle 42 similarly to the drive of the tapping-bit holder spindle 41 by means of the gear wheel 65, the chain 63 and the toothed pinion 44), the inner ring 72 of the ball-bearing 67, a spacer ring 73 and the inner ring 74 of the ball-bearing 68, the whole being gripped by a nut 75 screwed on the threaded upper end of the intermediate shaft 66. The outer rings 76, 77 of the two bearings 67, 68 are housed in a bore 78 of the block 13, closed by an annular plate 81 fixed by screws 82.

In the lower block 3, a hole 83 is pierced, for the clearance of the tapping-bit and for the removal of shavings, in line with the axis of the tapping-bit holder spindle borne by the upper block 13.

The actuating screw 4, the tap-holder spindle 41, 42 and the intermediate shaft 66 are produced in tubular form in order to be lighter and easier to cool. Their axes are all vertical and, consequently, parallel.

The operation of the device is extremely simple. On each press stroke, the upper unit 2 commences by descending, the nut 14 engaged on the fixed screw 4 is turned and, in its rotation drives, through the chain transmission 62, intermediate shaft 66 which, in its turn, through chain transmissions such as 63, rotates the two tap-holder spindles 41, 42. The multiplication ratio of the chain transmission 62, 63 is selected taking into account, both the value of the pitch of the reversible actuating screw 4 and the pitch of the tapping-bit 59, so that the descent of the upper tool-holder of the press tends to lower the tapping-bit at a linear speed a little greater than the axial speed which would be communicated to it by the simple fact that it is screwed into the hole of the part which it is in the act of tapping. Thus, as soon as the tapping-bit comes into contact with the entrance of the hole of the part, it starts to re-ascend a little in the rotary spindle 41, or, more exactly, it starts to be slowed down in its descending movement, whereas the spindle continues to descend at the speed of the upper tool-holder, so that the spring is compressed. From then on, the tapping-bit descends at its own speed, determined by its pitch, which is less than the speed of descent of the spindle. The tapping operation is carried out, then, the upper tool-holder of the press re-ascends at a greater speed than that of the tapping-bit which is unscrewed from the part under the effect of the chain transmission driven by the nut 14 which turns in reverse direction from that which had been imparted to it by the screw in the course of the descent of the tool-holder. During the course of re-ascent of the tool-holder, the spring 43 recovers, compensating for the difference in speeds of the tool-holder and of the tapping-bit.

The lower block is housed at the level of the blocks of the other lower tools (not shown) mounted on the press, so that a sheet metal strip can advance successively over the different tools to undergo thereat the necessary operations such as, for example: punching, deep-drawing of holes, tapping, curving, etc. On each press stroke, one or several finished parts fall without the tapping operation adding additional time to the operating cycle of the machine.

Considering that the sheet metal strips rest on and advance over the lower tool, it seems appropriate to mount the tapping-bit on the other tool; however, in particular applications, the reverse arrangement could, if necessary, be adopted. It would be possible also instead of turning the actuating nut 14 on a fixed screw 4, to turn the screw in the fixed nut, the screw then being mounted in the unit which bears the tapping-bit.

Addtionally, by way of modification, it would be possible to design a device in which the speed of the tapping-bit itself would, contrary to the hypothesis contemplated in the above described example, be greater than the vertical speed of the tool-holder, the mounting of the compensating spring being then obviously reversed. It would also be possible to envisage the centering of the tapping-bit in an axial direction, at half-stroke, between two opposing springs, or indeed to provide a spring with an adjustable travel. All these spring assemblies enable the tapping, if necessary, of holes with different pitches, if desired on the same part with the same tooling, without having to change the transmission ratios. Finally, in a very specialized modification, it would even be possible to contemplate the complete elimination of the compensating spring, but a meticulous adjustment would be obligatory to avoid the breakage of tapping-bits.

I claim:

1. Automatic tapping device for use on a mechanical stamping or deep-drawing press having upper and lower tool-holders comprising: a first block adapted to be mounted on one of said upper and lower tool-holders; a plurality of rotary tapping-bit holder spindles rotatably mounted in said first block; a two element reversible screw/nut system, one element of said system being mounted to rotate freely in said first block; a non-slip rotary drive transmission operably connecting said one element to said spindles to rotate the spindle upon rotation of said one element comprising, a driving gear wheel mounted on said one element to rotate therewith, an intermediate idler shaft mounted in said first block, a plurality of idler gear wheels mounted on said idler shaft, a first drive chain operatively engaging said driving gear wheel and one of said idler gear wheels, a driven gear wheel mounted on each spindle, and a plurality of second drive chains operatively engaging respective ones of said driven gear wheels and the other of said idler gear wheels; a second block adapted to be mounted on the other of said two tool-holders; a means to fix the other element of said two element system rigidly in said second block; for each spindle a tapping-bit clamping chuck for holding a tapping-bit mounted in said spindle to slide axially therein and rotate therewith, a spring in said spindle adapted to resiliently urge said clamping chuck axially toward said second block, an adjusting stop means operatively disposed between said clamping chuck and said spindle to limit the axial displacement of said clamping chuck with respect to said spindle in the direction of said second block; and said rotary drive transmission has a multiplication ratio slightly greater than the ratio of the pitches of said reversible screw and the tapping-bits.

2. Device according to claim 1, wherein said means to fix said other element of said two element system in said second block comprises a foot on said other element extending in a bore of said second block, at least one keyway in each of said foot and bore, and a key engaging in said keyways to prevent rotation of said other element.

3. Device according to claim 2, and further comprising a shoulder on said foot engaging one side of said second block, a threaded end on said foot, and a nut operatively engaging said threaded end and an end of said bore remote from said one side.

4. Device according to claim 1, and further comprising a tapping-bit clearance hole in said second block aligned with each tapping-bit holder spindle, defining opeinings having larger diameters than the respective tapping-bit being used.

5. Automatic tapping device for use on a mechanical stamping or deep-drawing press having upper and lower tool-holders comprising: a first block adapted to be mounted on one of said upper and lower tool-holders; a rotary tapping-bit holder spindle rotatably mounted in said first block; a two element reversible screw/nut system, one element of said system being mounted to rotate freely in said first block; a non-slip rotary drive transmission operably connecting said one element to the spindle to rotate the spindle upon rotation of said one element comprising a driving gear wheel mounted on said one element to rotate therewith, an intermediate idler shaft mounted in said first block, said intermediate idler shaft having a plurality of idler gear wheels thereon, a first drive chain operably engaging ssid driving gear wheel and one of said idler gear wheels, a driven gear wheel mounted on said spindle, and a second drive chain operably engaging said driven gear wheel and another one of said idler gear wheels, said gear wheels being relatively sized to produce two multiplier stages; a second block adapted to be mounted on the other of said two tool-holders, the other element of said two element system being rigidly fixed in said second block, a tapping-bit clamping chuck mounted in said spindle to slide axially therein and rotate therewith, and a spring in said sprindle adapted to resiliently urge said clamping chuck axially toward said second block.

6. Device according to claim 5, and further comprising a second rotary tapping-bit holder spindle mounted in said first block, a second driven gear wheel on said second holder spindle, and a third drive chain operably connecting said second driven gear wheel and a further one of said idler gear wheels.

* * * * *